United States Patent [19]
Inoue

[11] Patent Number: 5,551,254
[45] Date of Patent: Sep. 3, 1996

[54] DOUBLE EFFECT ABSORPTION REFRIGERATING MACHINE

[75] Inventor: Naoyuki Inoue, Kanagawa-ken, Japan

[73] Assignee: Ebara Corporation, Tokyo, Japan

[21] Appl. No.: 512,865

[22] Filed: Aug. 8, 1995

[30] Foreign Application Priority Data

Aug. 9, 1994 [JP] Japan ................................. 6-206111

[51] Int. Cl.⁶ ............................................. F23B 15/00
[52] U.S. Cl. ............................................. 62/489; 62/141
[58] Field of Search ........................... 62/101, 103, 476, 62/141, 489

[56] References Cited

U.S. PATENT DOCUMENTS

| | | | |
|---|---|---|---|
| 3,604,216 | 9/1971 | Porter | 62/141 |
| 3,626,710 | 12/1971 | Porter | 62/141 |

FOREIGN PATENT DOCUMENTS 48-64543 9/1973 Japan.
52-114151 9/1977 Japan.
6147682 5/1994 Japan ........................................ 62/141

*Primary Examiner*—Henry A. Bennett
*Assistant Examiner*—William C. Doerrler
*Attorney, Agent, or Firm*—Armstrong, Westerman, Hattori, McLeland & Naughton

[57] ABSTRACT

A double effect absorption refrigerating machine wherein a refrigerant vapor generated at a high temperature generator GH is used as a heat source of a low temperature generator GL, comprising a liquid level detecting heat exchanger XC for detecting a level of liquid at an outlet of a high temperature generator GH, which does not require any moving parts and air-tight and/or liquid-tight seal portions, with the result that reliable detection of the liquid level can be achieved indefinitely. The liquid level detecting heat exchanger XC comprises an effective heat transfer area variable according to a level of liquid in a solution piping which connects an outlet portion of the high temperature generator GH and the high temperature heat exchanger XH.

4 Claims, 4 Drawing Sheets

DOUBLE EFFECT ABSORPTION REFRIGERATING MACHINE

BACKGROUND OF THE INVENTION

The present invention relates to a double effect absorption refrigerating machine, and more particularly, to a double effect absorption refrigerating machine in which a level of liquid in an outlet portion of a high temperature generator is detectable.

PRIOR ART

In general, an absorption solution is concentrated in a high temperature generator and is then directed to a low temperature generator or an absorber. However, since the pressure in the high temperature generator is considerably higher than the pressures in the low temperature generator and the absorber, the high pressure cannot be maintained by liquid-tight seals in a piping arrangement. Conventionally, a liquid level in an outlet portion of a high temperature generator is detected, and an amount of liquid flowing into the high temperature generator or an amount of liquid flowing out of the high temperature generator is adjusted so that the liquid level in the outlet portion of the high temperature generator can be maintained within a certain range (for example, refer to JP-B2-58-23541; Japanese Patent Publication No. 23541/83).

FIG. 6 shows a conventional hydraulic circuit of float type capable of detecting the liquid level. A series flow cycle (having no diluted solution line 28 extending from a low temperature heat exchanger to a low temperature generator in FIG. 6), a branch flow cycle (having the diluted solution line 28 in FIG. 6), or a dual effect cycle can be applied to this hydraulic circuit.

In this float type, a float F is used to detect the liquid level and a signal proportional to a position of the float F is generated, so that an amount of liquid or diluted solution flowing into a high temperature generator GH is adjusted by using a regulating valve 34 or by controlling the number of revolutions of a solution pump SP or an amount of a liquid (a concentrated solution or a strong solution) flowing out of the high temperature generator GH is adjusted by using a regulating valve (not shown) according to the signal.

In this case, problems arise with respect to a large dimension of the float and corrosion of the float. Further, the ability of the float to move often deteriorates with time. Normally, since refrigerant and absorbent are contained by means of seal in the absorption refrigerating machine, when the float needs to be repaired, the machine is to be disassembled, which is very troublesome.

On the other hand, with respect to a type using a electrodes to detect the liquid level, the communication between the electrodes is turned ON or OFF depending whether or not liquid is present between electrodes, and does not require any moving parts. In this case, however, insulation portions (for enclosing the electrodes) are not reliable against a high temperature. Further, since the liquid level is determined by the ON/OFF control, it is difficult to perform continuous control.

SUMMARY OF THE INVENTION

An object of the present invention is to provide a double effect absorption refrigerating machine for detecting a level of liquid in a high temperature generator on the basis of temperature detection, which can solve the above-mentioned conventional drawbacks and does not require any moving parts or any air-tight and/or liquid-tight seal portions, with the result that reliable detection of the liquid level can be achieved indefinitely.

To solve the above-mentioned problems, according to the present invention, there is provided a double effect absorption refrigerating machine comprising an absorber, a low temperature generator, a high temperature generator, a condenser, an evaporator, a low temperature heat exchanger, a high temperature heat exchanger, a solution pump and solution paths. The double effect absorption refrigerating machine further comprises a liquid level detecting heat exchanger which has an effective heat transfer area variable according to a level of concentrated or strong solution in a concentrated solution piping which connects the high temperature generator and the high temperature heat exchanger. A heating fluid of the detecting heat exchanger consists of the concentrated solution in the piping. A heated fluid of the detecting heat exchanger consists of a diluted or weak solution. First temperature sensors detect temperatures of one of the heating and heated fluids at an inlet and an outlet of the detecting heat exchanger. A second temperature sensor detects a temperature of the other of the heating and heated fluids. A computing means conducts a calculation based on the temperatures detected by the first and second temperature sensors and constants of the detecting heat exchanger to generate a signal indicative of the level of the concentrated solution in the piping.

In the above-mentioned absorption refrigerating machine, it is preferable that a small piping extends within the concentrated solution piping and a small amount of the diluted solution flows from a portion located in a solution path between an outlet of the solution pump and an outlet of the high temperature heat exchanger through the small piping to the high temperature generator, and the first temperature sensors are disposed respectively at an inlet portion and an outlet portion of the small piping.

Further, it is preferable that the detecting heat exchanger comprises a diluted solution piping which connects the high temperature heat exchanger and the high temperature generator, and the concentrated solution piping which comprises a small piping extending within the diluted solution piping, a small amount of the concentrated solution flows from the high temperature generator through the small piping to the high temperature heat exchanger, and the first temperature sensors are disposed at an inlet portion and an outlet portion of the small piping.

The present invention also provides a method for detecting a liquid level of solution at an outlet portion of a high temperature generator in a double effect absorption refrigerating machine wherein a refrigerant vapor generated at the high temperature generator is used as a heat source of a low temperature generator.

The method comprises the step of providing a liquid level detecting heat exchanger having an effective heat transfer area variable according to a level of the concentrated solution in a concentrated solution piping which connects a solution outlet portion of the high temperature generator and a high temperature heat exchanger. The detecting heat exchanger is so constructed that one of two heat exchanging fluids has a flow amount far less than that of the other fluid thereby the one fluid has a large temperature difference in said detecting heat exchanger while a temperature of the other fluid changes only a small amount. The method comprises the step of operating the detecting heat exchanger in one state wherein the one fluid is a diluted solution which is taken out from a portion in a solution path between an outlet of a solution pump and an outlet of the high temperature heat exchanger and flows through said detecting heat exchanger to the high temperature generator while the other fluid is a concentrated solution which flows from the high temperature generator through the detecting heat exchanger to said high temperature heat exchanger, or in the other state wherein the one fluid is a part of the concentrated solution which flows from the high temperature generator through the detecting heat exchanger to the high temperature heat exchanger while the other fluid is the diluted solution which flows from the high temperature heat exchanger through the detecting heat exchanger to the high temperature generator.

The method further comprises the steps of generating a signal indicative of the temperature difference of the one fluid passing the detecting heat exchanger, generating a signal indicative of the temperature of the other fluid passing the detecting heat exchanger, and detecting the liquid level based on a calculation using the signal indicative of the temperature difference of the one fluid, the signal indicative of the temperature of the other fluid, and constants of the detecting heat exchanger.

OPERATION OF THE INVENTION

According to the present invention, in consideration of the fact that the amount of heat transfer transmitted via the small piping between the liquid and the vapor differs considerably, there is provided a liquid level detecting heat exchanger having an effective heat transfer area variable according to the level of liquid, so that the liquid level at the outlet portion of the high temperature generator is detected by detecting the difference in temperature of the concentrated solution or the diluted solution flowing into and flowing out of the liquid level detecting heat exchanger.

The liquid level at the outlet portion of the high temperature generator is detected in this way, and, on the basis of the detected liquid level, by adjusting the amount of liquid flowing into the high temperature generator or the amount of liquid flowing out of the high temperature generator, the liquid level at the outlet portion of the high temperature generator is maintained within a predetermined range, thereby achieving effective performance according to load fluctuation.

DETAILED DESCRIPTION OF THE PREFERRED EMBODIMENTS

Embodiments of the present invention will now be explained more specifically with reference to the accompanying drawings. However, it should be noted that the present invention is not necessarily limited to those embodiments.

Figure 1:
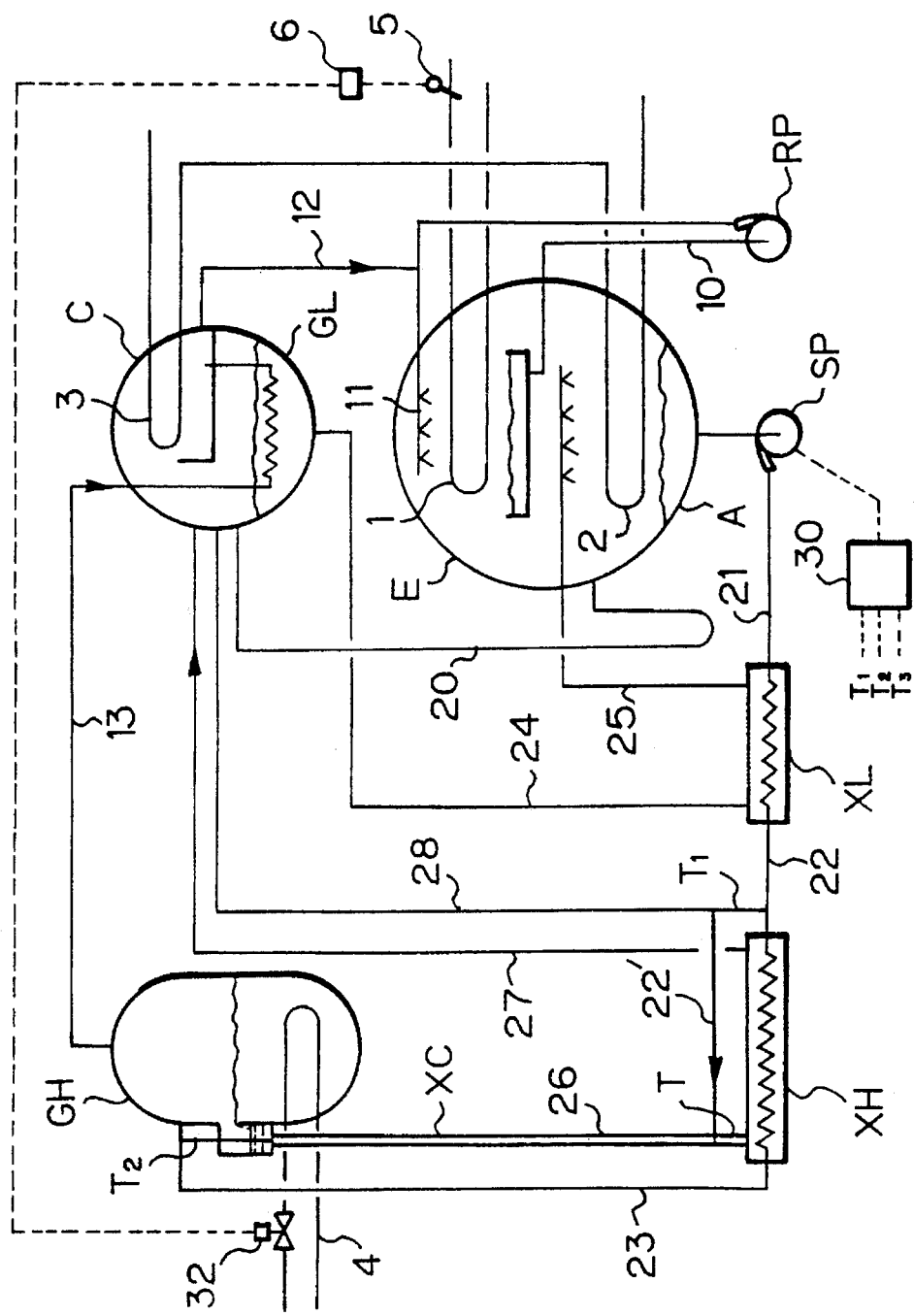
FIG. 1 is a hydraulic circuit of a double effect absorption refrigerating machine according to the present invention.

FIG. 1 shows a hydraulic circuit of a double effect absorption refrigerating machine according to one embodiment of the present invention. In FIG. 1, the hydraulic circuit is constituted by an absorber A, a low temperature generator GL, a high temperature generator GH, a condenser C, an evaporator E, a low temperature heat exchanger XL, a high temperature heat exchanger XH, a solution pump SP, a refrigerant pump RP, a cold water piping 1 connected to any cooling load, cooling water pipings 2, 3, a heat source piping 4, a temperature sensor 5, an output controller 6, refrigerant pipings 10-13, diluted solution pipings 21, 22, 22', 23, 28, concentrated solution pipings 24–27, a computer 30, valves 32, 34.

As shown in FIGS. 2–5 which are enlarged views, a liquid level detecting heat exchanger XC is disposed in association with the piping 23 or 26 extending between the high temperature generator GH and the high temperature heat exchanger XH.

Figure 2:
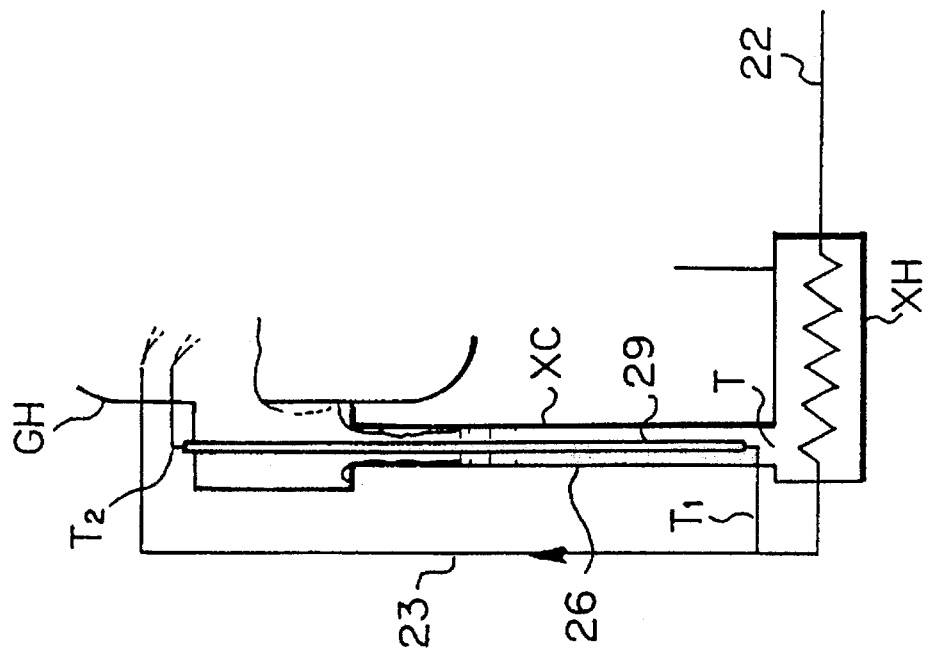
FIG. 2 is an enlarged view showing an example of a portion of FIG. 1.

In FIG. 2, the liquid level detecting heat exchanger XC is joined to the concentrated solution piping 26 and has an inner small pipe 29 which connects a bypass 22' from the dilute solution piping 22 and the piping 23. Further, there are provided temperature sensors $T_1$, $T_2$ for measuring temperature of the dilute solution at an inlet and an outlet of the small pipe 29, and a temperature sensor T for measuring the temperature of the heat exchanger XC.

Figure 3:
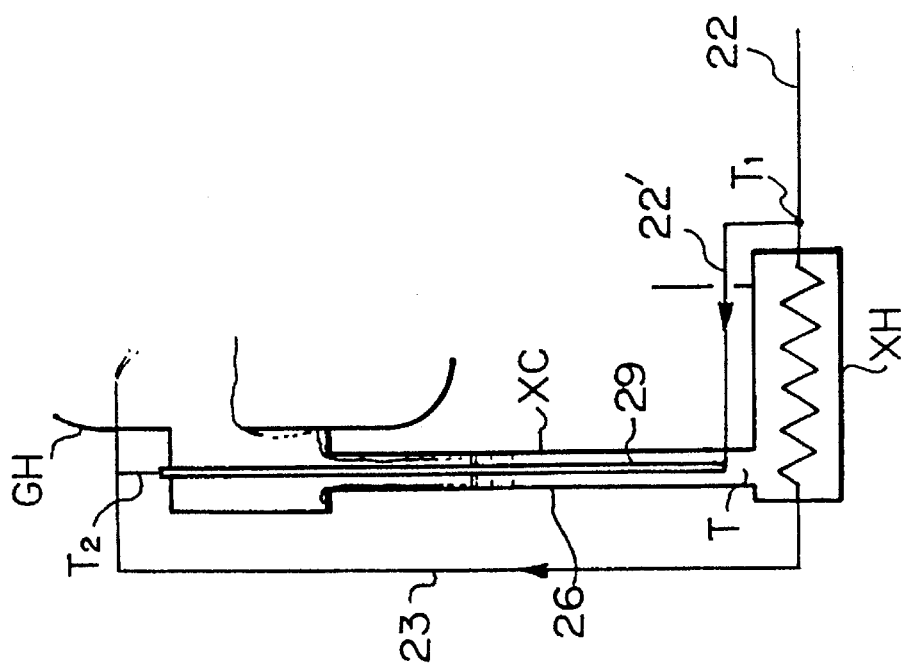
FIG. 3 is a similar view of FIG. 2 but showing one variation of the portion shown in FIG. 2.

In FIG. 3, the liquid level detecting heat exchanger XC is joined to the concentrated solution piping 26 and has an inner small pipe 29. A small amount of the diluted solution flows from the piping 23 through the detecting heat exchanger to the high temperature generator GH. Temperature sensors are arranged at an inlet and an outlet of the small pipe 29 for measuring temperatures $T_1$, $T_2$ of the dilute solution at an inlet and an outlet of the small pipe 29, and a temperature sensor is arranged for measuring the temperature T of the heat exchanger XC.

Figure 4:
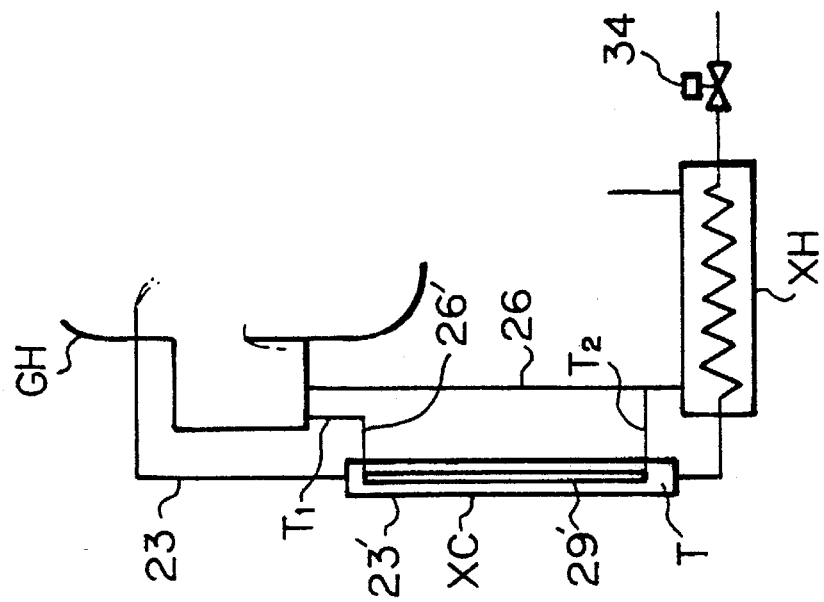
FIG. 4 is a similar view of FIG. 2 but showing another variation of the portion shown in FIG. 2.

FIG. 4 is a similar view of FIGS. 2 and 3 but showing another variation of the portion shown in FIG. 2. In the FIG. 4, the liquid level detecting heat exchanger XC is joined to the concentrated solution piping 26 and has an inner small pipe 29. A small amount of the diluted solution flows from a portion in a solution path in the high temperature heat exchanging XH through the detecting heat exchanger XC to the high temperature generator GH. Temperature sensors are arranged at an inlet and an outlet of the small pipe 29 for measuring temperatures $T_1$, $T_2$ of the dilute solution at an inlet and an outlet of the small pipe 29, and a temperature sensor is arranged for measuring the temperature T of the concentrated solution at the outlet of an outlet of the detecting heat temperature XC.

Figure 5:
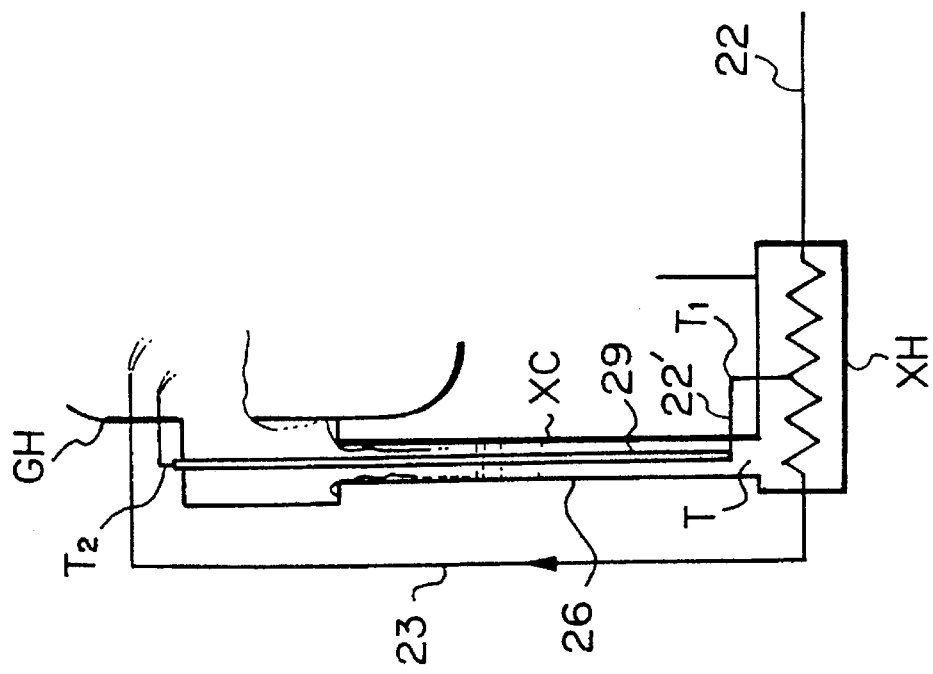
FIG. 5 is an enlarged view showing another example of the portion of FIG. 1.
Figure 6:
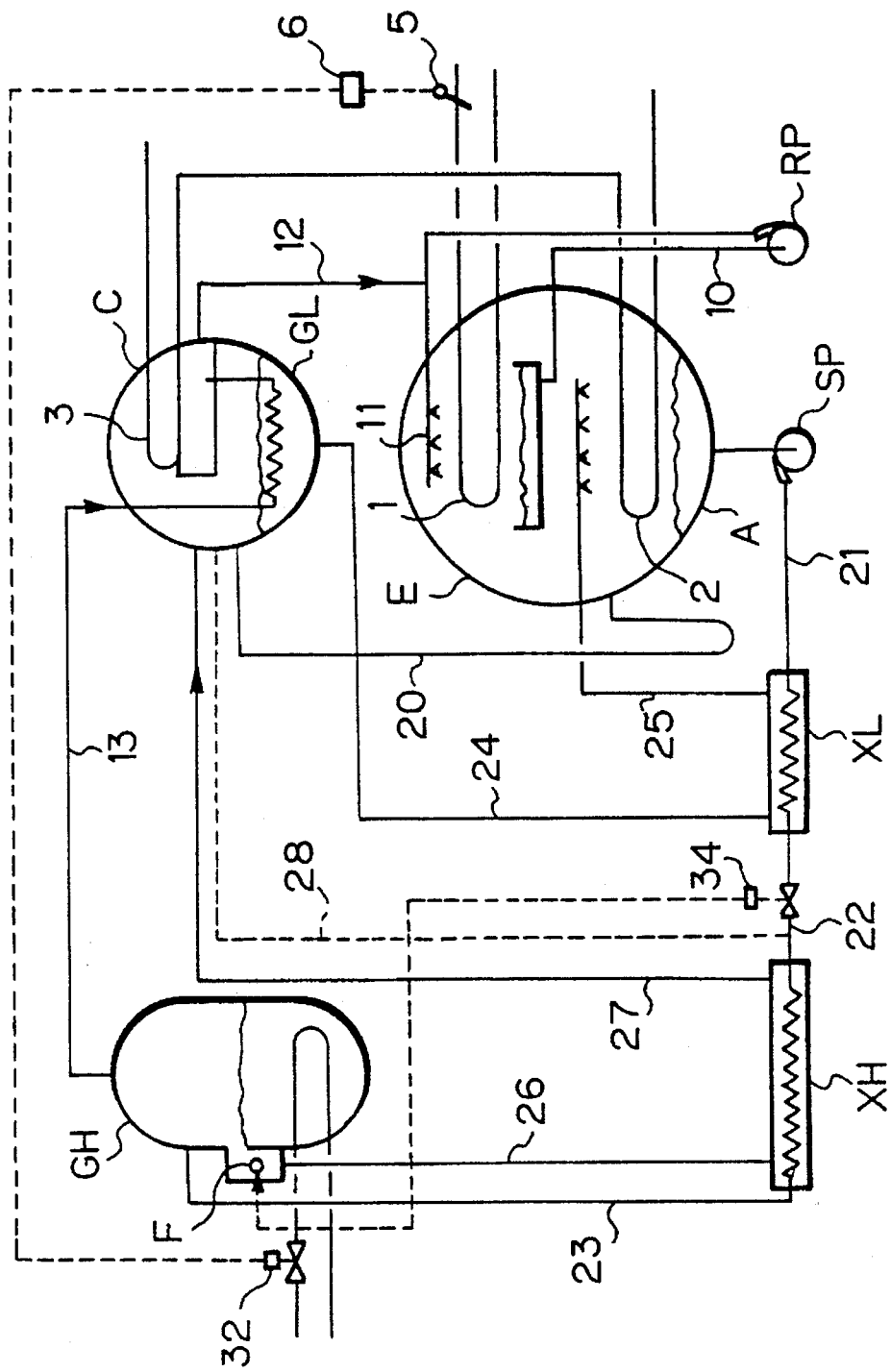
FIG. 6 is a hydraulic circuit of a conventional double effect absorption refrigerating machine.

FIG. 5 is generally similar to FIG. 2, but, in FIG. 5, the liquid level detecting heat exchanger XC is joined to the dilute solution piping 23. The dilute solution piping 23 connects the high temperature heat exchanger and the high temperature generator GH. The small pipe 29' and 26' form a bypass pipe of the concentrated solution piping 26.

With the arrangements shown in FIG. 2, according to the present invention, a signal regarding the level of the liquid in the concentrated solution piping 26 at the outlet portion of the high temperature generator is obtained from the increase in temperature of the diluted solution passing through the small pipe 29 placed within the concentrated solution piping 26. According to this signal, the number of revolutions of the solution pump SP is adjusted to regulate the amount of the liquid flowing into the generator, thereby controlling the level of the liquid.

Alternatively, according to the above-mentioned signal, a control valve for the solution pump may be adjusted to regulate the amount of the liquid flowing into the generator, thereby controlling the liquid level, or the control valve may be disposed in the high temperature concentrated solution line to regulate the amount of the concentrated solution flowing out of the high temperature generator, thereby controlling the liquid level.

FIG. 2 shows an example in which the level of the liquid in the piping is detected by the fact that effective heat transfer areas for the concentrated solution and diluted solution change according to the level of the liquid and the changes in the temperature of the diluted solution passing through the small pipe. That is to say, at a zone where there is no concentrated solution, the diluted solution in the small pipe is surrounded by the vapor. In this case, since the heat transfer from the vapor is considerably less than the heat transfer from the concentrated solution, it can be assumed that the heat transfer is not effected at the zone where the concentrated solution does not exist.

Regarding the flow rate at the heat exchanging portion, since the flow rate of the concentrated solution is much greater than the flow rate G of the bypassed dilute solution, it can be assumed that the temperature T of the concentrated solution does not change. Thus, a heat transfer amount $\delta Q$, which corresponds to the difference between the temperature T and the average temperature $Tm=(T_1+T_2)/2$ of the diluted solution, is obtained. That is:

$$\delta Q = U\pi dL(T-Tm)$$

Where, U is heat transmissivity or heat transfer rate, d is diameter of the small pipe and L is an effective heat transfer length.

On the other hand, the heat difference of the bypassed diluted solution when its temperature changes from the inlet temperature $T_1$ to the outlet temperature $T_2$, is as follows:

$$\delta Q = GC(T_2 - T_1)$$

Where, G is flow rate of the bypassed diluted solution and C is specific heat of the diluted solution.

From the above equations, the effective heat transfer length L can be represented by the following equation:

$$L = (GC/U\pi d) \times (T_2 - T_1)/(T - Tm)$$
$$= K(T_2 - T_1)/(T - Tm)$$

When the inlet temperature $T_1$ is used in place of the average temperature Tm, temperature efficiency of the heat exchanger can be obtained.

Approximately, $L = K\phi$, and the ratio between the value L and the effective heat transfer length $L_0 = K\phi_0$ when the effective heat transfer area extends through the full length, i.e. $L/L_0 = \phi/\phi_0$ may be used as a signal representative of the liquid level.

FIG. 5 shows an example in which the level of the liquid is determined from the change in temperature of the concentrated solution passing through the small pipe 29' disposed in the dilute solution piping 23'.

In this case, the concentrated solution bypassed from the high temperature generator GH is introduced into the small pipe 29', and then, the bypassed concentrated solution is returned to the concentrated solution piping 26. Effective heat transfer areas for concentrated solution and dilute solution are changed according to the level of the liquid, thereby changing the heat transfer amount. That is to say, at a zone where there is no concentrated solution, the vapor in the small pipe is surrounded by the diluted solution. In this case, since the heat transfer from the vapor is considerably less than the heat transfer from the concentrated solution, it can be assumed that the heat transfer is not effected at the zone where the concentrated solution does not exist.

Regarding the flow rate at the heat exchanging portion, since the flow rate of the diluted solution is considerably greater than the flow rate G of the bypassed concentrated solution, it can be assumed that the temperature T of the diluted solution does not change. Thus, a heat transfer amount $\delta Q$, which corresponds to the difference between the temperature T and the average temperature $Tm=(T_1+T_2)/2$ of the concentrated solution, is obtained. That is:

$$\delta Q = U\pi dL(Tm-T)$$

Where, U is heat transmissivity, d is diameter of the small pipe and L is an effective heat transfer length.

On the other hand, the heat difference of the bypassed concentrated solution when its temperature changes from the inlet temperature $T_1$ to the outlet temperature $T_2$, is as follows:

$$\delta Q = GC(T_1 - T_2)$$

From the above equations, the effective heat transfer length L can be represented by the following equation:

$$L = (GC/U\pi d) \times (T_1 - T_2)/(Tm - T)$$
$$= K(T_1 - T_2)/(Tm - T)$$

When the inlet temperature T1 is used in place of the average temperature Tm, temperature efficiency of the heat exchanger can be obtained.

Approximately, $L = K\phi$, and the ratio between the value L and the effective heat transfer length $L_0 = K\phi_0$ when the effective heat transfer area extends through the full length, i.e. $L/L_0 = \phi/\phi_0$ may be used as a signal representative of the liquid level.

Effect of the Invention

As mentioned above, according to the present invention, since the liquid level at the outlet portion of the high temperature generator is determined from the change in temperature, there is no need to provide any moving parts or any air-tight and/or liquid-tight seal portions, with the result that reliable detection of the liquid level can be achieved for indefinitely.

What is claimed is:

1. A double effect absorption refrigerating machine comprising an absorber (A), a low temperature generator (GL), a high temperature generator (GH), a condenser (C), an evaporator (E), a low temperature heat exchanger (XL), a high temperature heat exchanger (XH), and a solution pump (SP), characterized in that;

said refrigerating machine further comprises;

a liquid level detecting heat exchanger (XC) which has an effective heat transfer area variable according to a level of concentrated solution in a concentrated solution piping (26, 29') which connects said high temperature generator (GH) and said high temperature heat exchanger (XH), a heating fluid of said detecting heat exchanger (XC) consisting of the concentrated solution in said piping (26, 29'), a heated fluid of said detecting heat exchanger (XC) consisting of a diluted solution;

first temperature sensors for detecting temperatures ($T_1$, $T_2$) of one of said heating fluid and heated fluid at an inlet and an outlet of said detecting heat exchanger (XC), a second temperature sensor for detecting a temperature (T) of the other of said heating fluid and heated fluid, and a computing means (30) for conducting a calculation based on the temperatures ($T_1$, $T_2$, T) detected by said first and second temperature sensors and constants of said detecting heat exchanger (XC) to generate a signal indicative of the level of concentrated solution in said piping (26, 29').

2. A double effect absorption refrigerating machine according to claim 1, wherein a small piping (29) extends within said concentrated solution piping (26), a small amount of said diluted solution flows from a portion located in a solution path between an outlet of said solution pump (SP) and an outlet of said high temperature heat exchanger (XH) through said small piping (29) to said high temperature generator (GH), and said first temperature sensors are disposed respectively at an inlet portion and an outlet portion of said small piping (29).

3. A double effect absorption refrigerating machine according to claim 1, wherein said detecting heat exchanger (XC) comprises a diluted solution piping (23') connecting said high temperature heat exchanger (XH) and said high temperature generator (GH), and said concentrated solution piping comprises a small piping (29') extending within said diluted solution piping (23'), a small amount of said concentrated solution flows from said high temperature generator (GH) through said small piping (29') to said high temperature heat exchanger (XH), and said first temperature sensors are disposed at an inlet portion and an outlet portion of said small piping (29').

4. A method for detecting a liquid level of solution at an outlet portion of a high temperature generator (GH) in a double effect absorption refrigerating machine wherein a refrigerant vapor generated at said high temperature generator (GH) is used as a heat source of a low temperature generator (GL), said method comprising the steps of;

providing a liquid level detecting heat exchanger (XC) having an effective heat transfer area variable according to a level of concentrated solution in a concentrated solution piping (26, 29') connecting said outlet portion of said high temperature generator (GH) and a high temperature heat exchanger (XH), said detecting heat exchanger (XC) being so constructed that one of two heat exchanging fluids has a flow amount far less than that of the other fluid thereby said one fluid has a large temperature difference ($T_2-T_1$) in said detecting heat exchanger (XC), while a temperature (T) of the other fluid changes only a small amount, operating said detecting heat exchanger (XC) in one state wherein said one fluid is a diluted solution which is taken out from a portion in a solution path between an outlet of a solution pump (SP) and an outlet of said high temperature heat exchanger (XH) and flows through said detecting heat exchanger (XC) to said high temperature generator (GH) while said other fluid is a concentrated solution which flows from said high temperature generator (GH) through said detecting heat exchanger (XC) to a high temperature heat exchanger (XH), or in the other state wherein said one fluid is a part of the concentrated solution which flows from said high temperature generator (GH) through said detecting heat exchanger (XC) to a high temperature heat exchanger (XH) while said other fluid is the diluted solution which flows from said high temperature heat exchanger (XH) through said detecting heat exchanger (XC) to said high temperature generator (GH), generating a signal indicative of a temperature difference ($T_2-T_1$) of said one fluid passing said detecting heat exchanger (XC), generating a signal indicative of the temperature (T) of said other fluid passing said detecting heat exchanger (XC), and detecting said liquid level based on a calculation using said signal indicative of the temperature differences ($T_2-T_1$) of the one fluid, said signal indicative of the temperature (T) of said other fluid, and constants of said detecting heat exchanger (XC).

* * * * *